United States Patent
Guo et al.

(10) Patent No.: US 7,930,533 B1
(45) Date of Patent: Apr. 19, 2011

(54) PXE BOOTING A STORAGE PROCESSOR FROM A PEER STORAGE PROCESSOR

(75) Inventors: Ying Guo, Northborough, MA (US); Qing Liu, Grafton, MA (US); Kevin Richards, Attleboro, MA (US)

(73) Assignee: EMC Corporation, Hopkinton, MA (US)

(*) Notice: Subject to any disclaimer, the term of this patent is extended or adjusted under 35 U.S.C. 154(b) by 779 days.

(21) Appl. No.: 11/904,302

(22) Filed: Sep. 26, 2007

(51) Int. Cl.
*G06F 15/177* (2006.01)
*G06F 9/00* (2006.01)
*G06F 15/16* (2006.01)
*G06F 15/76* (2006.01)
*G06F 11/00* (2006.01)

(52) U.S. Cl. ............... 713/2; 713/1; 713/375; 709/222; 712/2; 712/10; 712/28; 712/32; 714/10; 714/23

(58) Field of Classification Search ............ 713/2, 375, 713/1; 709/222; 712/10, 28, 32, 2; 714/10, 714/23
See application file for complete search history.

(56) References Cited

U.S. PATENT DOCUMENTS

| | | | |
|---|---|---|---|
| 4,335,426 A * | 6/1982 | Maxwell et al. | 709/222 |
| 4,752,870 A * | 6/1988 | Matsumura | 709/222 |
| 5,701,417 A * | 12/1997 | Lewis et al. | 709/222 |
| 7,650,490 B2 * | 1/2010 | Barron et al. | 713/2 |
| 2009/0204751 A1 * | 8/2009 | Kushita | 711/104 |

OTHER PUBLICATIONS

"Preboot Execution Environment (PXE) Specification," Version 2.1, Publication by Intel Corporation, Sep. 20, 1999 (102 pages).
"Introduction to the CX3 UltraScale Series—Applied Technology," White Paper by EMC Corporation, Jun. 2007 (36 pages).
"Introduction to the CX300," Engineering White Paper by EMC Corporation, Jun. 13, 2006 (16 pages).
"EMC CLARiiON CX Series—Extending the lead in midrange storage," Data Sheet, No. C1075-5, EMC Corporation, May 2006 (7 pages).

* cited by examiner

*Primary Examiner* — Stefan Stoynov
(74) *Attorney, Agent, or Firm* — Muirhead and Saturnelli, LLC (57) ABSTRACT

A system for pre-execution environment (PXE) booting a storage processor from a peer storage processor allows for the ability to reboot and/or restart the storage processor without an externally connected PXE server. In response to a reboot request of the storage processor, the peer storage processor pushes an operating system boot image and/or other information to the storage processor for PXE booting the storage processor, and vice versa. The system may also operate with multiple coupled computers.

22 Claims, 6 Drawing Sheets

PXE BOOTING A STORAGE PROCESSOR FROM A PEER STORAGE PROCESSOR

TECHNICAL FIELD

This application relates to storage systems and, more particularly, to the field of booting storage processors.

BACKGROUND OF THE INVENTION

A pre-execution environment (PXE—or preboot execution environment) server is used to PXE boot a pre-built operating system (OS) of a processor (processor board). The PXE server is typically a separate, external system running PXE software The processor requiring reboot connects directly to the PXE server via a direct or indirect Ethernet connection. For a description of conventional PXE booting processes and protocols, see the *Preboot Execution Environment (PXE) Specification*, version 2.1, published by Intel Corporation on Sep. 20, 1999, which is incorporated herein by reference.

A storage processor may be used to control a disk array or similar non-volatile storage. An erasure process of a storage processor may involve PXE booting the storage processor by booting a pre-built operating system image to the storage processor that operates to purge the disk array of the storage processor of useful data. System reboots are sometimes caused during and after the erasure process, for example forced by the pre-built operating system image. In this case, the reboot process requires a separate PXE server, such a service laptop computer, to be connected to the storage processor during the entire erasure process and, if necessary, after the erasure process, and may require manual intervention during the reboot process.

Accordingly, it would be desirable to provide a system of PXE booting a storage processor without a constantly direct-connected external PXE server and without requiring manual intervention.

SUMMARY OF THE INVENTION

According to the system described herein, a system for controlling a boot process includes a first processor and a second processor coupled to the first processor. Each of the first processor and the second processor may include a boot loader. The boot loader of the first processor may communicate with the second processor to obtain information used for a boot process of the first processor after the first processor initiates the boot process of the first processor, and the boot loader of the second processor may communicate with the first processor to obtain information used for a boot process of the second processor after the second processor initiates the boot process of the second processor. The boot process may be a pre-execution environment (PXE) boot process and a particular one of the first processor and the second processor that initiates the PXE boot process may be a PXE client and the other one of the first processor and the second processor that communicates the information used in the PXE boot process may be a PXE server. The first processor and the second processor may both be storage processors and may both be disposed within a storage enclosure. The first processor and the second processor may be central processing units (CPUs) and included in first and second computers.

At least one server may be coupled to each of the first processor and the second processor or each of the first processor and the second processor may include at least one server. The at least one server includes a dynamic host configuration protocol (DHCP) server and a boot server, and wherein the information used for the boot processes of the first processor and the second processor includes an Internet protocol address and a boot image. At least one interface may be coupled to at least one of the first processor and the second processor.

According further to the system described herein, a method of controlling a boot process includes providing a first processor coupled to a second processor and providing a boot loader in each of the first processor and the second processor. In response to the boot loader of the first processor initiating a boot process of the first processor and communicating with the second processor, the second processor may transmit information used for the boot process to the first processor. In response to the boot loader of the second processor initiating a boot process of the second processor and communicating with the first processor, the first processor may transmit information used for the boot process to the second processor. The boot process may be a pre-execution environment (PXE) boot process and a particular one of the first processor and the second processor that initiates the PXE boot process may be a PXE client and the other one of the first processor and the second processor that communicates the information used in the PXE boot process may be a PXE server. The first processor and the second processor may both be storage processors and may both be disposed within a storage enclosure. The first processor and the second processor may be central processing units (CPUs) and included in first and second computers.

At least one server may be provided that is coupled to each of the first processor and the second processor or each of the first processor and the second processor may include at least one server. The at least one server includes a dynamic host configuration protocol (DHCP) server and a boot server, and wherein the information used for the boot processes of the first processor and the second processor includes an Internet protocol address and a boot image. At least one interface may be provided that is coupled to at least one of the first processor and the second processor.

According further to the system described herein, a computer program product, stored in a computer-readable medium, for controlling a boot process includes executable code that initiates a boot process in a first processor. Executable code may broadcast a boot request from the first processor. Executable code may receive information used in the boot process of the first processor that is transmitted from a second processor in response to the boot request. Executable code may boot the first processor using the information used in the boot process of the first processor that is received from the second processor. Executable code may receive a boot request from the second processor. Executable code may access information used in the boot process for the second processor. Executable code may transmit the information used in the boot process for the second processor to the second processor. The boot process may be a pre-execution environment (PXE) boot process. The information used for the boot process may include an Internet protocol address and a boot image.

According further to the system described herein, a system for controlling a pre-execution environment (PXE) boot process using multiple storage processors includes a first storage processor and a second storage processor coupled to the first processor. Executable code may be stored in a computer-readable medium of the first storage processor and the second storage processor, wherein the executable code of a particular one of the first storage processor and the second storage processor controls communication with the other of the first storage processor and the second storage processor to obtain boot information when the particular one of first storage processor and the second storage processor initiates the PXE boot process. Executable code, stored in a computer-readable medium of the first storage processor and the second storage processor, may obtain information used for the PXE boot process in response to a PXE boot request. The information used for the PXE boot process includes an Internet protocol address and a boot image.

According further to the system described herein, a computer storage system includes at least one storage device, a first storage processor coupled to the at least one storage device, and a second storage processor coupled to the first storage processor and to the at least one storage device. Each of the first storage processor and the second storage processor may include a boot loader, wherein the boot loader of a particular one of the first storage processor and the second storage processor communicates with the other of the first storage processor and the second storage processor to obtain information used for a boot process after the particular one of first storage processor and the second storage processor initiates the boot process.

BRIEF DESCRIPTION OF THE DRAWINGS

Embodiments of the system are described with reference to the several figures of the drawings, described as follows.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system.

Figure 1:
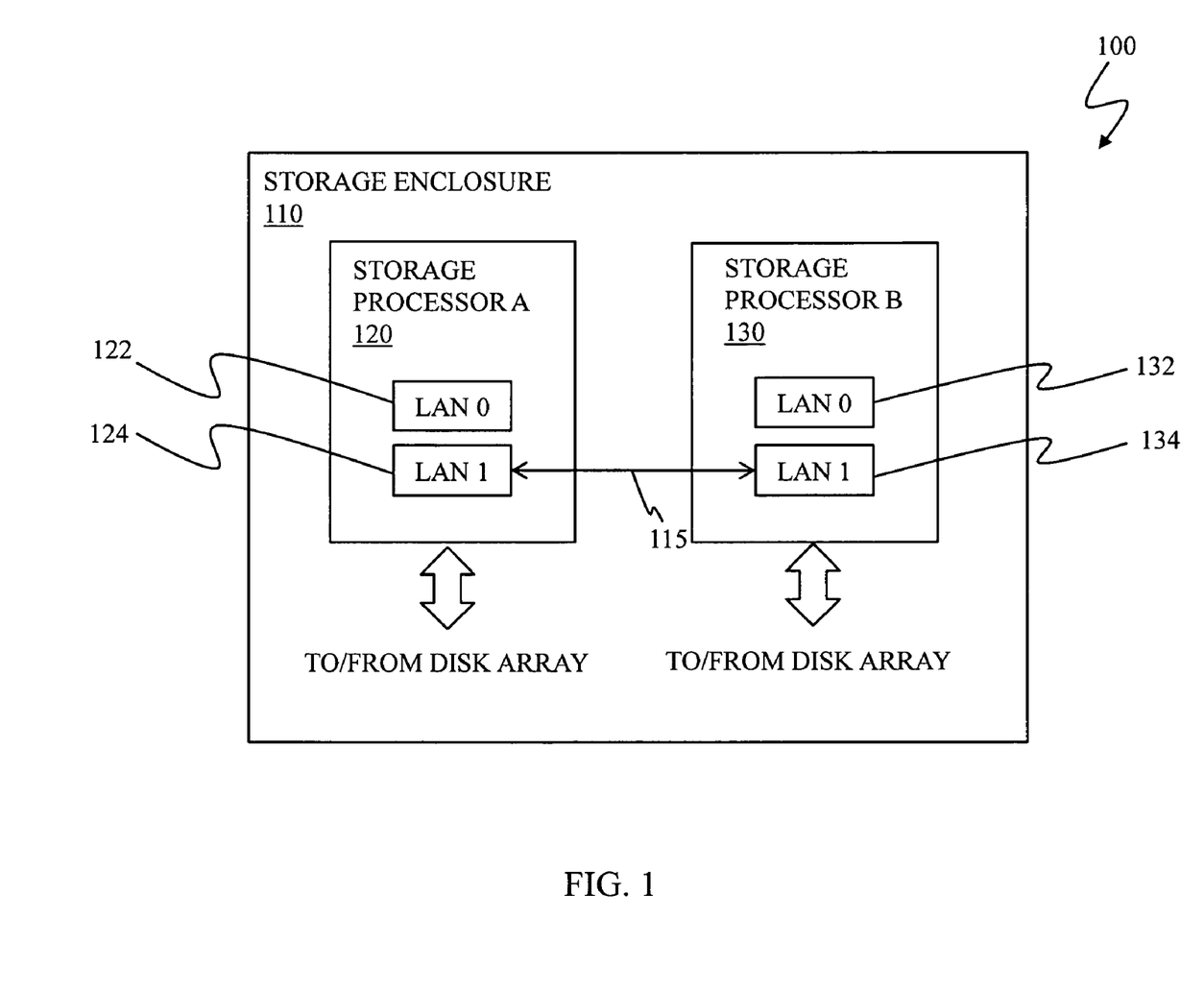
FIG. 1 is a schematic illustration of a storage system including a storage enclosure and two peer storage processors, storage processor-A (SPA) and storage processor-B (SPB) contained within the storage enclosure, according to an embodiment of the system described herein.

FIG. 1 is a schematic illustration of a storage system 100 including a storage enclosure 110 and two peer storage processors (storage processor boards): storage processor A (SPA) 120 and storage processor B (SPB) 130. According to an embodiment of the system described herein, storage processor A 120 and storage processor B 130 may be contained within the storage enclosure 110 and may be coupled to one or more disk arrays (not shown in FIG. 1) or similar storage devices controlled by one or more of the storage processors 120, 130. Each of the storage processors 120, 130 may include one or more ports, for example, two Ethernet ports that communicate using tcp/ip. The storage processor 120 may have a LAN0 port 122 and a LAN1 port 124 while the storage processor 130 may have a LAN0 port 132 and a LAN1 port 134. As illustrated, the LAN1 port 124 on the SPA 120 is connected to the LAN1 port 134 on the SPB 130 via a connection 115. In various embodiments, the connection may be a cross-over Ethernet cable and/or one or both of the LAN1 ports 124, 134 may utilize auto-sensing capabilities with any suitable cable. The LAN1 port 124 on the SPA 120 may have a static Internet protocol (IP) address assigned thereto that is different from another static IP address assigned to the LAN1 port 134 on the SPB 130. Alternatively, the ports may obtain a dynamic IP address using, for example, DHCP. It should be noted that although the illustrated embodiment shows two ports on each processor that may be used as service and/or management ports, the system described herein may operate with only one port on each processor or may operate with more than two ports on each processor.

In an embodiment, when a reboot is requested on the SPB 130, the SPA 120 may be the PXE server for the SPB 130 and may push the OS image contained in a memory associated with the SPA 120 to the SPB 130 to allow for PXE booting of the SPB 130. Additionally, the SPB 130 may be the PXE server for the SPA 120. That is, when a reboot is requested on the SPA 120, the SPB may push the OS image contained in a memory associated with the SPB 130 to the SPA 130 for PXE booting the SPA 130. The system described herein provides the storage system 100 with the ability to automatically reboot and restart the storage processors without a constantly connected external PXE server and without requiring manual intervention. It should be noted that no hard drive may be required. The system described herein may be used in conjunction with an erasure process to purge a storage system.

In other embodiments, if both the SPA 120 and the SPB 130 request a reboot at the same time, internal collaboration procedures and/or other external procedures/systems may be used to concurrently handle each of the requests. For example, initially, at least one of the processors may be booted using an external processor, such as a laptop that is connected to the processor by, for example, one of the ports 122, 124, 132, 134. For example, a service laptop may be connected to one or both of the processors in connection with a service call for the erasure process to purge the storage system. Thereafter, the system described herein does not require rebooting using the external processor; instead, as described herein, each one of the processors may be rebooted using the other peer storage processor, as needed.

In various embodiments, the system described herein may operate with storage systems produced by EMC Corporation of Hopkinton, Mass., including, for example, CLARiiON® storage systems, such as the CX3 series, and Symmetrix storage systems. Other appropriate storage systems may also be used, including any storage systems using multiple processors.

Figure 2:
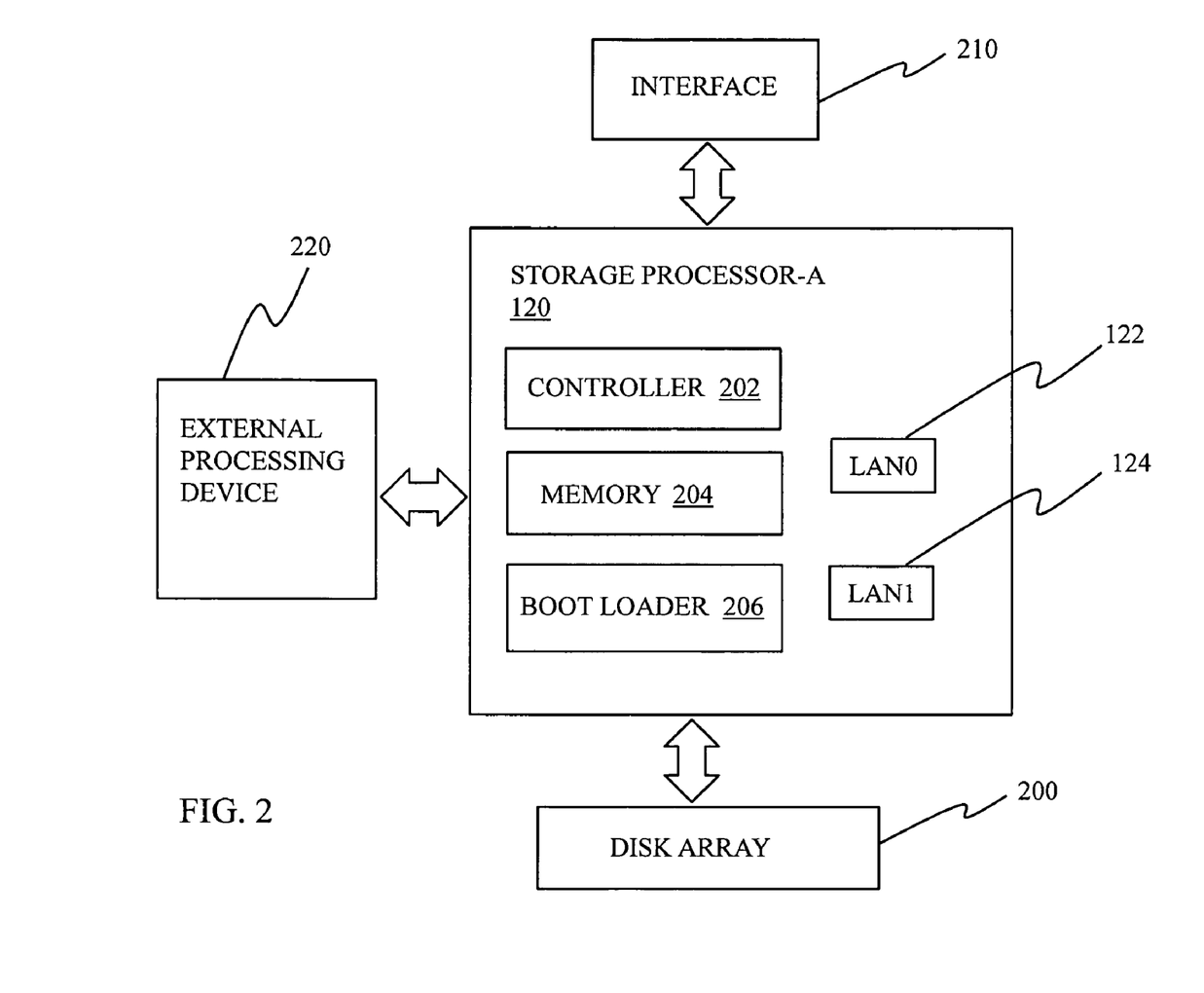
FIG. 2 is a schematic illustration of a configuration of the SPA according to an embodiment of the system described herein.

FIG. 2 is a schematic illustration of the SPA 120 according to an embodiment of the system described herein. The SPA 120 may include a controller module 202, a memory 204, and a boot loader system 206, among other components. The controller module 202, memory 204 and the boot loader system 206 may be coupled together as separate modules and/or may incorporated into one module. In various embodiments, the controller module 202 may include a central processing unit (CPU) motherboard with one or more microprocessors, e.g., Intel processors, that control operations of the SPA 120, including accessing the memory 204, e.g., volatile memory, which may include random access memory (RAM), flash memory and/or other suitable memory. In an embodiment, the memory 204 may be greater than or equal to five hundred twelve Mb of memory. The boot loader system 206, such as a basic input/output system (BIOS), may be included as part of firmware code, embedded on a computer read-only memory (ROM), included in flash memory and/or included as part of some other software or hardware system that allows the storage processor to obtain and process a boot image and/or other boot information for PXE booting, as further discussed elsewhere herein.

The SPA 120 may be coupled to a disk array 200, which represents any appropriate storage systems/devices. The disk array 200 may be contained within the storage enclosure 110 and/or disposed externally to the storage enclosure 110. The SPA 120 may also be coupled to a user interface 210, including one or more software programs such as Navisphere® products, for example, produced by EMC Corporation of Hopkinton, Mass., that allows management of the storage processors 120, 130 and/or the entire storage system 100. The interface 210 may also include hardware and/or software products accessible via a network, such as an intranet and/or the Internet. The SPA 120 may include one or more network interface cards (NICs). The SPA 120 may also be powered by a power supply (not shown) and may include ports for coupling to the power supply.

The SPA 120 may be coupled to an external processing device 220 that may include one or more servers, as discussed herein. The external processing device 220 may include a dynamic host configuration protocol (DHCP) server that may supply an IP address when requested and may also include a boot server with memory containing a boot image and/or other boot files that may be downloaded to the storage processor, the SPB 130, in connection with requesting a PXE boot and acting as a PXE client. The DHCP server may be the same server as or different server from the boot server. The external processing device 220 may be incorporated as part of the SPA 120 and/or may be located separately from, and accessed by, the SPA 120. For example, the external processing device 220 may be accessed by the SPA 120 using a network, such as an intranet and/or the Internet. Alternatively, for example, the SPA 120 may include the boot server incorporated therein and the DHCP server may be coupled to, but located separately from, the SPA 120.

Figure 3:
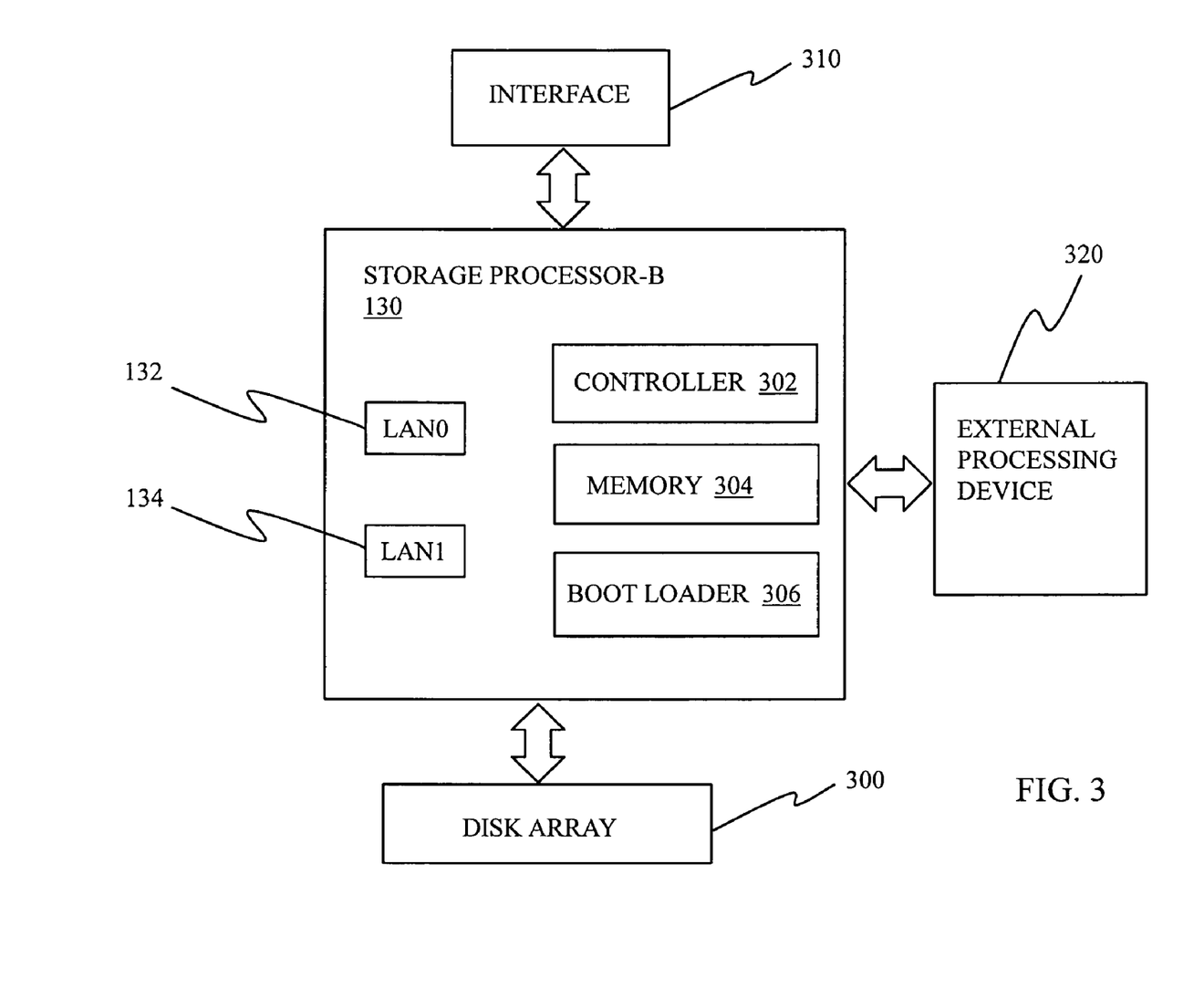
FIG. 3 is a schematic illustration of a configuration of the SPB according to an embodiment of the system described herein.

FIG. 3 is a schematic illustration of a configuration of the SPB 130 according to an embodiment of the system described herein. The SPB 130 may be similarly configured with similar components and couplings as described herein with respect to the SPA 120. The SPB 130 may include a controller 302, a memory 304, and a boot loader 306. The SPB 130 may be coupled to an interface 310 and an external processing device 320. As further discussed elsewhere herein, the external processing device 320 may be separate from the SPB 130 or incorporated as part of the SPB 130. If separate from the SPB 130, it is possible that the external processing device 220 and the external processing device 320 may be the same device. Similarly, the interface 210 and the interface 310 may be the same interface. The SPB 130 may operate as a PXE server, as described herein, with respect to the SPA 120 in the event that the SPA 120, acting as a PXE client, requires a PXE reboot. The SPB 130 may be coupled to a disk array 300 (representing any appropriate storage systems/devices) contained within the storage enclosure 110 and/or disposed externally to the storage enclosure 110. Note that the disk array 300 coupled to the SPB 130 may be the same as or different from the disk array 200 coupled to the SPA 120.

Figure 4:
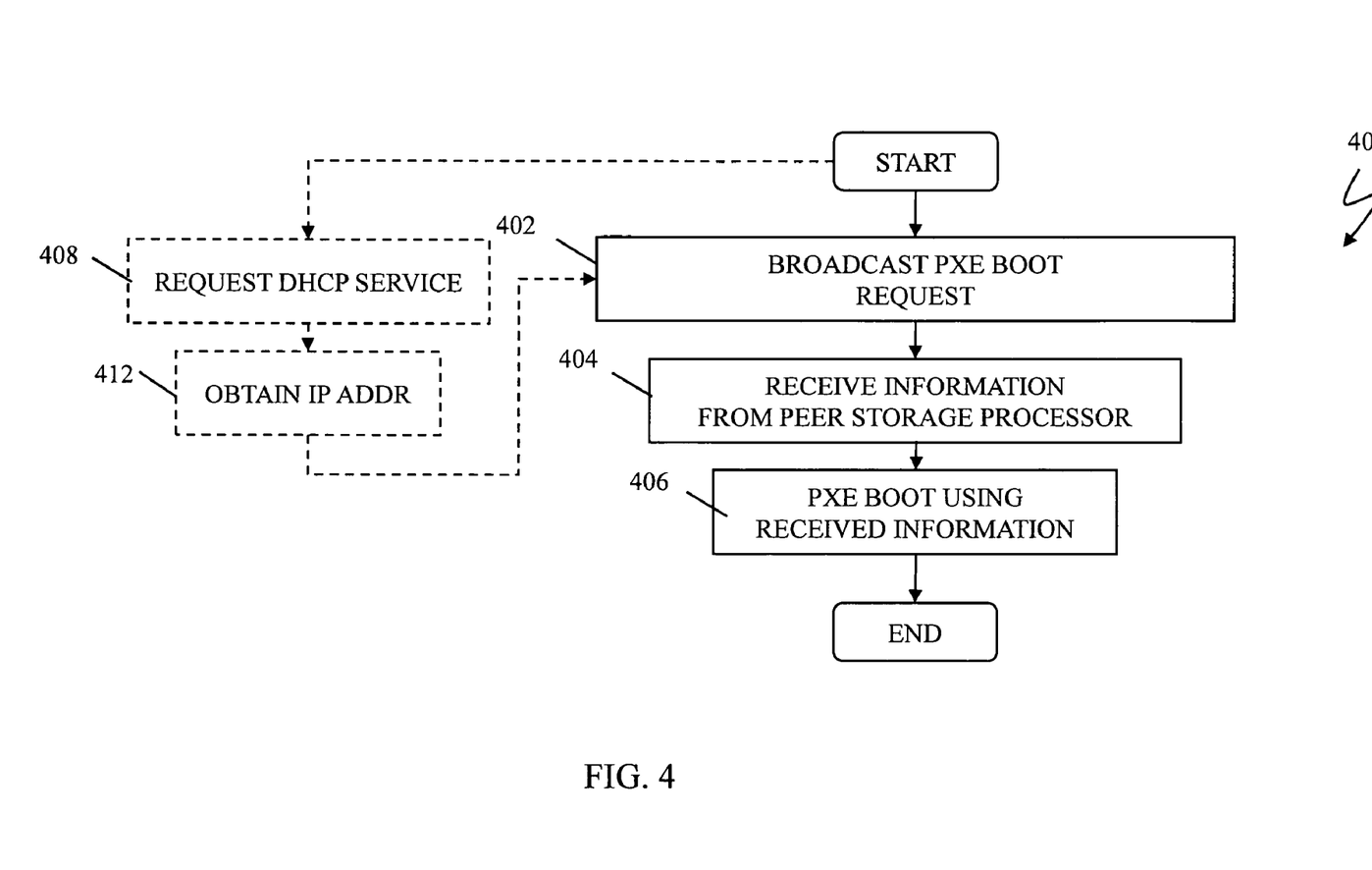
FIG. 4 is a flow diagram showing PXE booting of a storage processor (SPB) by a peer storage processor (SPA) according to an embodiment of the system described herein.

FIG. 4 is a flow diagram 400 showing PXE booting of a storage processor (e.g., SPB 130), acting as a PXE client, by a peer storage processor (e.g., the SPA 120), acting as a PXE server, according to an embodiment of the system described herein. At a step 402, the boot loader of the storage processor requiring PXE booting, e.g., the boot loader 306 of the SPB 130, broadcasts a PXE reboot request that may be received by the peer storage processor, e.g., the SPA 120, via the connection 115. After the step 402, processing proceeds to a step 404 where the boot loader 306 of the SPB 130 receives information from the SPA 120. The information may include a boot image and/or other boot files for PXE booting, as further discussed elsewhere herein. After the step 404, processing proceeds to a step 406 where the SPB 130 performs appropriate procedures to undergo PXE booting using the received information, which may include, for example, executable code corresponding to the boot image. After the step 406, processing is complete.

Note that it is possible for the storage processor (e.g., the SPA 120) to need to obtain an IP address prior to booting. In such a case, processing may begin at a step 408 where the storage processor requests an IP address by, for example, broadcasting a DHCP request. Note that, as discussed elsewhere herein, the DHCP request may be serviced by the same server that services the PXE request or by a different server. Following the step 408 is a step 412 where the storage processor obtains (receives) the IP address requested at the step 408. Following the step 412, processing proceeds at the step 402, as discussed above. Note that the steps 408, 412 may not be executed under certain circumstances. For example, the storage processor may have a static IP address or may reuse (retain) a dynamic IP address that was obtained earlier.

Figure 5:
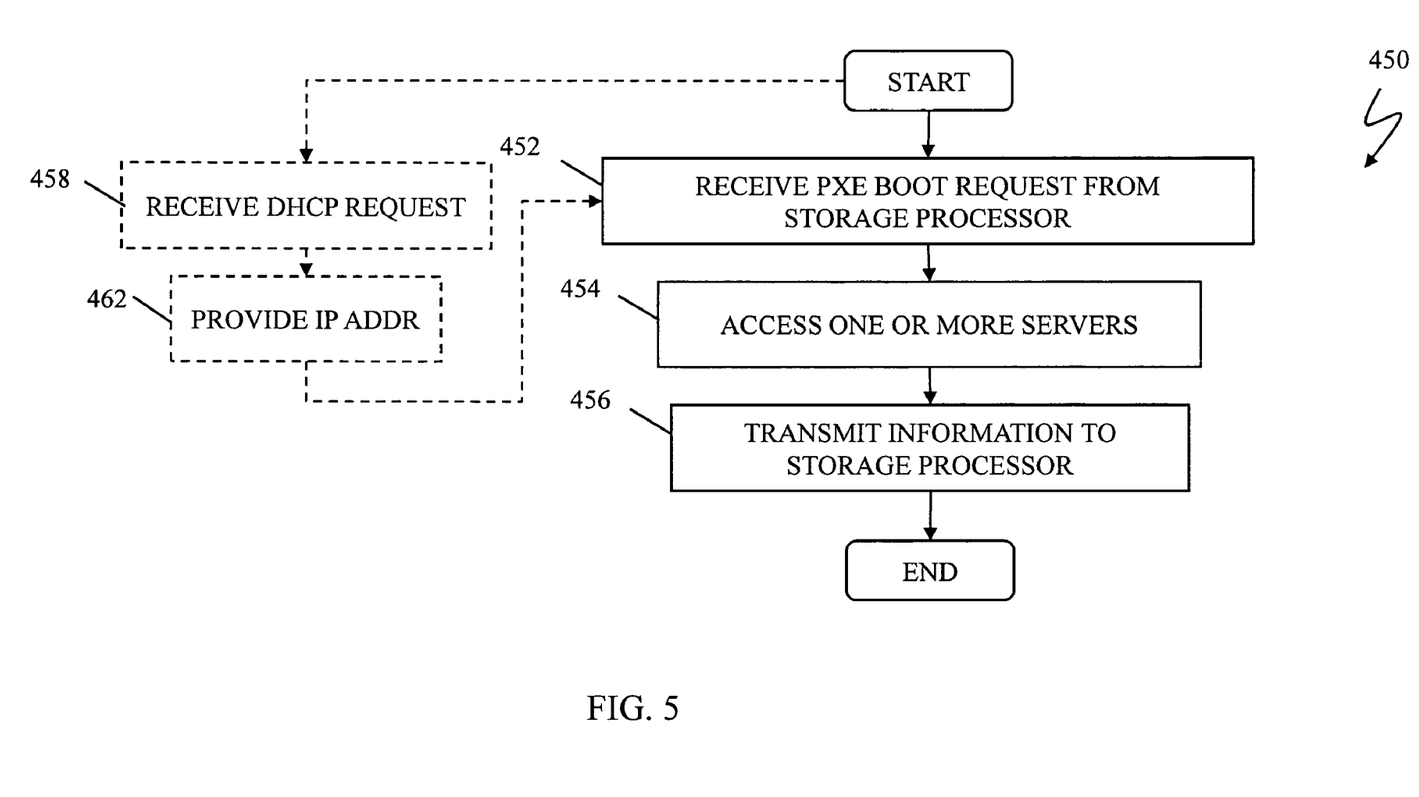
FIG. 5 is a flow diagram showing processes at the peer storage processor (SPA) in response to a request from the storage processor (SPB).

FIG. 5 is a flow diagram 450 showing processes at the peer storage processor (e.g., SPA 120), acting as the PXE server (and possibly a DHCP server), in response to a request from the storage processor (e.g., SPB 130), acting as the PXE client. At a step 452, the SPA 120 receives a PXE boot request from the SPB 130 via the connection 115. After the step 452, processing proceeds to a step 454 where the SPA 120 obtains information that may include a boot image and other boot files (data) for PXE booting the SPB 120. As further discussed elsewhere herein, the SPA 120 may access an external processing device 220 located remotely from the SPA 120 that may include a DHCP server and/or a boot server. In other embodiments, the external processing device 220 may be incorporated as part of the SPA 120. The IP address to be allocated to the SPB 130 may be supplied by the DHCP server and the boot image and/or other boot files and information may be downloaded from the boot server. After the step 454, processing proceeds to a step 456 where the boot information is transmitted from the SPA 120 to the boot loader 306 of the SPB 130 for PXE booting the SPB 130. After the step 456, processing is complete.

Note that it is possible for the storage processor (e.g., the SPB 130) to need to provide a dynamic IP address to the client. In such a case, processing may begin at a step 458 where the storage processor receives a request for an IP address (e.g., a DHCP request). Following the step 458 is a step 462 where the storage processor provides the dynamic IP address. Following the step 462, processing proceeds to the step 452, as discussed above. Note that the steps 458, 462 may not be executed under certain circumstances. For example, the client storage processor may have a static IP address, may reuse (retain) a dynamic IP address that was obtained earlier, or may obtain a dynamic IP address from another source (e.g., a DHCP server separate from the PXE server).

The processes described herein may be controlled by executable code stored on a computer-readable medium on the SPA 120 and the SPB 130 that executes the steps of the processes.

The system described herein may operate with any suitable operating system, including, for example, Linux®, Windows® and DOS operating systems and, accordingly, the boot image downloaded to the storage processor from the peer storage processor may include a boot image corresponding to the above-noted operating systems. The system described herein may also operate in conjunction the Microsoft Windows Preinstallation Environment (PE) operating system.

In another embodiment, the system described herein may operate in conjunction with multiple computers, such as personal computers (PCs), instead of multiple storage processors.

Figure 6:
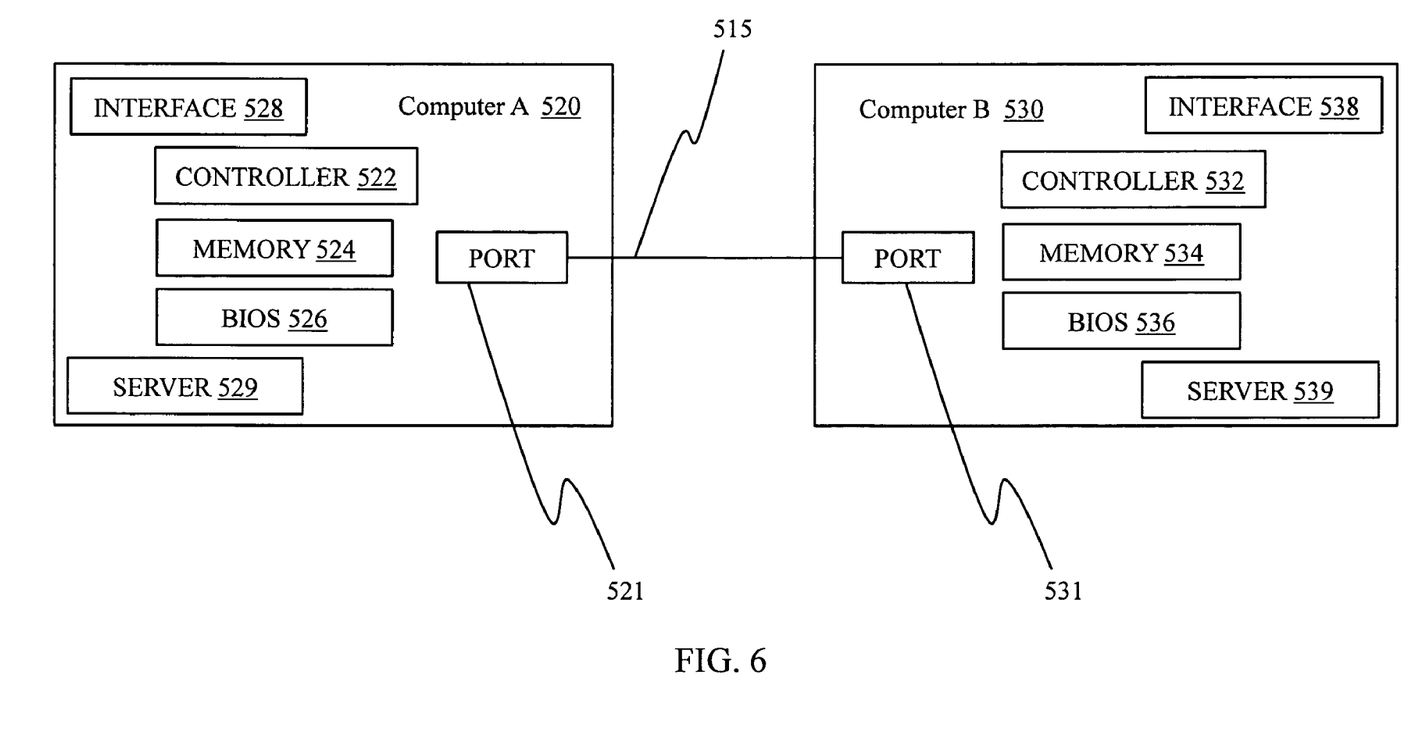
FIG. 6 is a schematic illustration showing a personal computer-A (CA) coupled to a personal computer-B (CB) for PXE booting according to an embodiment of the system described herein.

FIG. 6 is a schematic illustration showing a computer A (CA) 520 coupled to a computer B (CB) 530 via a connection 515 for PXE booting according to an embodiment of the system described herein. The connection 515 may include a direct connection using a cross-over Ethernet cable, may include a cable connection that is used in conjunction with auto-sensing capability at each of the CA 520 and the CB 530 and/or may be a network connection, between a port 521 of the CA 520 and a port 531 of the CB 530. Each of the CA 520 and the CB 530 may include a controller 522, 532, a memory 524, 534 and a BIOS 526, 536 that requests and loads boot information for PXE booting, as further discussed elsewhere herein. The controller 522, 532 may include CPU motherboards with microprocessors and the memory 524, 534 may include RAM, flash memory and/or other appropriate memory, as further discussed elsewhere herein.

Each of the CA 520 and the CB 530 is shown as incorporating an interface 528, 538 and a server 529, 539. Each of the interfaces 528, 538 may include a software component, as further discussed elsewhere herein. Each of the servers 529, 539 may include a DHCP server for assigning an IP address to a requesting computer and a boot server that provides a boot image and/or other boot information to the requesting computer. The interfaces 528, 538 and servers 529, 539 are shown incorporated within the respective computers 520, 530; however, in other embodiments, the interfaces 528, 538 and servers 529, 539 may be located separately from the computers 520, 530. For example, the servers 529, 539 may be accessed by the computers 520, 530 over a network, such as an intranet or the Internet.

It should also be noted that in other embodiments the system described herein may also be used in conjunction with more than two storage processors (see, e.g., FIG. 1) and more than two computers (see, e.g., FIG. 6). In the case of multiple processors or computers, additional procedures may be used to request PXE booting. For example, a processor or computer requiring PXE booting may broadcast PXE boot requests that are received by the multiple peer processors and/or computers coupled thereto. It may also be possible to specifically target PXE boot requests. After broadcasting a request and receiving multiple responses, the processor and/or computer requiring PXE booting may select one of the IP addresses and/or boot images that are received from the responding processors and/or computers. Boot images not selected may be ignored by the requesting computer and IP addresses not selected may time out at the end of an IP address license period.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A system for controlling a boot process, comprising:
a first processor; and
a second processor coupled to the first processor, the first processor and the second processor being disposed in the same enclosure, wherein each of the first processor and the second processor include a boot loader, and wherein the boot loader of the first processor communicates with the second processor to obtain information used for a boot process of the first processor after the first processor initiates the boot process of the first processor, and wherein the boot loader of the second processor communicates with the first processor to obtain information used for a boot process of the second processor after the second processor initiates the boot process of the second processor, wherein the boot process of the first processor includes a pre-execution environment boot process (PXE) and wherein the boot process of the second processor includes a PXE boot process, wherein a particular one of the first processor and the second processor that initiates the PXE boot process is a PXE client and the other one of the first processor and the second processor that communicates the information used in the PXE boot process is a PXE server, and wherein each of the first processor and the second processor is capable of being, respectively, the PXE server and the PXE client.

2. The system according to claim 1, wherein the first processor and the second processor are both storage processors, and wherein the enclosure in which both storage processors are disposed is a storage enclosure.

3. The system according to claim 1, wherein the first processor and the second processor are both central processing units (CPUs).

4. The system according to claim 1, further comprising:
at least one server coupled to each of the first processor and the second processor.

5. The system according to claim 4, wherein the at least one server includes a dynamic host configuration protocol (DHCP) server and a boot server, and wherein the information used for the boot processes of the first processor and the second processor includes an Internet protocol address and a boot image.

6. The system according to claim 1, wherein each of the first processor and the second processor include at least one server.

7. The system according to claim 6, wherein the at least one server includes a dynamic host configuration protocol (DHCP) server and a boot server, and wherein the information used for the boot processes of the first processor and the second processor includes an Internet protocol address and a boot image.

8. The system according to claim 1, further comprising:
at least one interface coupled to at least one of the first processor and the second processor.

9. A method of controlling a boot process, comprising:
providing a first processor coupled to a second processor, the first processor and the second processor being disposed in the same enclosure; and
providing a boot loader in each of the first processor and the second processor,
wherein, in response to the boot loader of the first processor initiating a pre-execution environment (PXE) boot process of the first processor and communicating with the second processor, the second processor acts as a PXE server and transmits information used for the PXE boot process of the first processor to the first processor that acts as a PXE client, and wherein, in response to the boot loader of the second processor initiating a PXE boot process of the second processor and communicating with the first processor, the first processor acts as the PXE server and transmits information used for the PXE boot process of the second processor to the second processor that acts as the PXE client.

10. The method according to claim 9, wherein the first processor and the second processor are both storage processors, and wherein the same enclosure in which both storage processors are disposed is a storage enclosure.

11. The method according to claim 9, wherein the first processor and the second processor are both central processing units (CPUs).

12. The method according to claim 9, further comprising:
providing at least one server coupled to each of the first processor and the second processor.

13. The method according to claim 12, wherein the at least one server includes a dynamic host configuration protocol (DHCP) server and a boot server, and wherein the information used for the PXE boot processes of the first processor and the second processor includes an Internet protocol address and a boot image.

14. The method according to claim 9, wherein each of the first processor and the second processor include at least one server.

15. The method according to claim 14, wherein the at least one server includes a dynamic host configuration protocol (DHCP) server and a boot server, and wherein the information used for the boot processes of the first processor and the second processor includes an Internet protocol address and a boot image.

16. The method according to claim 9, further comprising:
providing at least one interface coupled to at least one of the first processor and the second processor.

17. A non-transitory computer-readable medium storing software for controlling a boot process, the software comprising:
executable code that initiates a pre-execution environment (PXE) boot process in a first processor;
executable code that broadcasts a boot request from the first processor;
executable code that receives information used in the PXE boot process of the first processor that is transmitted from a second processor in response to the boot request, the first processor and the second processor being disposed in the same enclosure;
executable code that boots the first processor using the information used in the PXE boot process of the first processor that is received from the second processor;
executable code that initiates a PXE boot process in the second processor;
executable code that receives a boot request from the second processor;
executable code that accesses information used in the PXE boot process for the second processor; and
executable code that transmits the information used in the PXE boot process for the second processor to the second processor,
wherein a particular one of the first processor and the second processor that initiates the PXE boot process is a PXE client and the other one of the first processor and the second processor that communicates the information used in the PXE boot process is a PXE server, and wherein each of the first processor and the second processor is capable of being, respectively, the PXE server and the PXE client.

18. The non-transitory computer readable medium according to claim 17, wherein the information used for the PXE boot process includes an Internet protocol address and a boot image.

19. A system for controlling a pre-execution environment (PXE) boot process using multiple storage processors, comprising:
a first storage processor;
a second storage processor coupled to the first processor, the first processor and the second processor being disposed in the same storage enclosure, and
executable code stored in a computer-readable medium of the first storage processor and the second storage processor, wherein the executable code of a particular one of the first storage processor and the second storage processor controls communication with the other of the first storage processor and the second storage processor to obtain boot information when the particular one of first storage processor and the second storage processor initiates the PXE boot process, wherein the particular one of the first storage processor and the second storage processor that initiates the PXE boot process is a PXE client and the other one of the first storage processor and the second storage processor that communicates the information used in the PXE boot process is a PXE server, and wherein each of the first processor and the second processor is capable of being, respectively, the PXE server and the PXE client.

20. The system according to claim 19, further comprising:
executable code, stored in a computer-readable medium of the first storage processor and the second storage processor, that obtains information used for the PXE boot process in response to a PXE boot request.

21. The system according to claim 19, wherein the information used for the PXE boot process includes an Internet protocol address and a boot image.

22. A computer storage system, comprising:
at least one storage device;
a first storage processor coupled to the at least one storage device; and
a second storage processor coupled to the first storage processor and to the at least one storage device, the first storage processor and the second storage processor being disposed in the same storage enclosure, wherein each of the first storage processor and the second storage processor include a boot loader, wherein the boot loader of a particular one of the first storage processor and the second storage processor communicates with the other of the first storage processor and the second storage processor to obtain information used for a pre-execution environment (PXE) boot process after the particular one of first storage processor and the second storage processor initiates the boot process, wherein the particular one of the first storage processor and the second storage processor that initiates the PXE boot process is a PXE client and the other one of the first processor and the second processor that communicates the information used in the PXE boot process is a PXE server, and wherein each of the first processor and the second processor is capable of being, respectively, the PXE server and the PXE client.

* * * * *